US012579272B2

(12) United States Patent
Jalayeri et al.

(10) Patent No.: US 12,579,272 B2
(45) Date of Patent: Mar. 17, 2026

(54) MEASURED BOOT AND ATTESTATION FOR DISTRIBUTED EDGE DEVICES IN AIR-GAPPED ENVIRONMENTS

(71) Applicant: Zededa Inc., San Jose, CA (US)

(72) Inventors: Shahriyar Jalayeri, Berlin (DE); Erik Nordmark, Mountain View, CA (US)

(73) Assignee: Zededa Inc., San Jose, CA (US)

( * ) Notice: Subject to any disclaimer, the term of this patent is extended or adjusted under 35 U.S.C. 154(b) by 25 days.

(21) Appl. No.: 18/669,432

(22) Filed: May 20, 2024

(65) Prior Publication Data

US 2025/0356017 A1 Nov. 20, 2025

(51) Int. Cl.
*G06F 21/00* (2013.01)
*G06F 21/57* (2013.01)
*G06F 21/60* (2013.01)
*G06F 21/64* (2013.01)

(52) U.S. Cl.
CPC .......... *G06F 21/572* (2013.01); *G06F 21/602* (2013.01); *G06F 21/64* (2013.01)

(58) Field of Classification Search
None
See application file for complete search history.

(56) References Cited

U.S. PATENT DOCUMENTS

| | | | | |
|---|---|---|---|---|
| 8,782,435 | B1 * | 7/2014 | Ghose ................. | G06F 12/0862 |
| | | | | 712/216 |
| 10,762,183 | B1 | 9/2020 | Charan et al. | |

| | | | | |
|---|---|---|---|---|
| 12,033,006 | B1 | 7/2024 | Nair et al. | |
| 2013/0198838 | A1 * | 8/2013 | Schmidt ................ | H04L 63/126 |
| | | | | 726/22 |
| 2018/0067845 | A1 | 3/2018 | Costello, Jr. et al. | |
| 2019/0206090 | A1 | 7/2019 | Ray et al. | |

(Continued)

FOREIGN PATENT DOCUMENTS

| | | |
|---|---|---|
| CN | 113627735 | 11/2021 |

OTHER PUBLICATIONS

EVE Edge Virtualization Engine, https://lfedge.org/projects/eve/, retrieved on Sep. 23, 2024, 8 pages.

(Continued)

*Primary Examiner* — Andrew J Steinle
(74) *Attorney, Agent, or Firm* — Raubvogel Law Office

(57) ABSTRACT

A computer-implemented method for establishing trustworthiness of an Edge Computing Device may include predicting a platform configurable register (PCR) value for a system update to generate a predicted PCR value, and then storing the predicted PCR value. The method may further include running the system update by storing updated software on the Edge Computing Device, measuring one or more aspects of the updated software to generate a measured PCR value, comparing the measured PCR value with the predicted PCR value to determine that the measured PCR value matches the predicted PCR value. Responsive to determining that the measured PCR value matches the predicted PCR value, secret information may be transmitted. Predicting the PCR value may include using a TPM log to generate a pre-calculated hash of one or more changed parts of the updated software. Enhanced Authorization may be used to generate an authorization policy including the predicted PCR value.

28 Claims, 4 Drawing Sheets

(56)         References Cited

U.S. PATENT DOCUMENTS

| 2020/0167474 | A1* | 5/2020 | Goldman ............. H04L 9/3247 |
|---|---|---|---|
| 2021/0107141 | A1 | 4/2021 | Shrivastava et al. |
| 2021/0326736 | A1 | 10/2021 | Kishimoto et al. |
| 2022/0292221 | A1 | 9/2022 | Sohail et al. |
| 2023/0318950 | A1 | 10/2023 | Davies-Barrett et al. |
| 2025/0355987 | A1 | 11/2025 | Sankaran et al. |

OTHER PUBLICATIONS

Trusted Computing Group, "TPM 2.0 Library specification", https://trustedcomputinggroup.org/resource/tpm-library-specification/, retrieved on Sep. 23, 2024, 12 pages.

\* cited by examiner

MEASURED BOOT AND ATTESTATION FOR DISTRIBUTED EDGE DEVICES IN AIR-GAPPED ENVIRONMENTS

TECHNICAL FIELD

The present document relates to security for computing devices such as IoT Edge gateways.

BACKGROUND

For purposes of the description provided herein, certain terms are defined as follows:

A "Distributed Edge" may be a network in which client data is processed at the periphery of the network, for example, close to the origin of the data.

An "Edge Computing Device" may be a device that provides an entry point into an enterprise or service provider core network such as a Distributed Edge. An Edge Computing Device in a Distributed Edge may be referred to as a Distributed Edge Device.

An Internet of Things gateway, or "IoT gateway," is one type of Edge Computing Device, and may be a physical device and/or virtual platform that connect sensors, IoT modules, and/or smart devices to a network such as the Internet. An IoT gateway may collect and/or transmit data to other devices in the network.

An "Edge Orchestrator" may be a hardware and/or software resource that manages and/or coordinates the flow of resources between multiple types of devices, infrastructure, and network domains in a Distributed Edge.

A "Trusted Controller" may be a device on a network for which trustworthiness has been established. A Trusted Controller may be used to update, modify, control, and/or verify trustworthiness of another device, such as an Edge Computing Device.

Proving trustworthiness is a common requirement for distributed systems in general, but it becomes even more important for geographically remote systems like IoT Edge gateways, as there is often no physical perimeter security for these devices. The unique operational requirements of Edge gateways, and the attack possibilities associated with them, include:

1. In some deployments, Edge Computing Devices at the Distributed Edge may operate in geographically remote locations, such as on top of wind turbines or in mid-ocean oil extraction zones, where manual access to the device is limited. In such deployments, the only way to get operational information about the Edge Computing Device at the Distributed Edge may be by having each Edge Computing Device at the Distributed Edge, itself, ship its operational state to the Trusted Controller. Thus, providing visibility of the operational status of the device to the Trusted Controller at any time is helpful. Even if there is an attack and the software running on an Edge Computing Device at the Distributed Edge has been modified, it may be helpful if the Edge Computing Device, itself, is able to detect and report such an incident to the Trusted Controller.

2. In some deployments, Internet connectivity and/or power supply are not reliable. There can be intermittent loss of connectivity between Edge Computing Devices at the Distributed Edge and the Trusted Controller, and an Edge Computing Device at the Distributed Edge may be expected to continue operating with the last-known configuration until it is able to reach the Trusted Controller again. There can be power outages as well.

Once power is back online, the Edge Computing Device at the Distributed Edge may be expected to boot up, return to its last operational state, and resume its Edge Container Instances (even if connectivity is still down).

3. Some Edge Computing Devices at the Distributed Edge may also be deployed at locations where the device is prone to security attacks, such as on a smart pole, on an industrial factory floor, and/or the like. Such Edge Computing Devices at the Distributed Edge can be easily attacked by inserting USB drives, or the device itself can be physically hijacked to a different location for possible extraction of user data.

4. For Edge Computing Devices at the Distributed Edge, software upgrades are typically done remotely from the Trusted Controller. Ensuring integrity of the upgrade in a zero-trust environment is a challenge. It may be important to determine whether Edge Computing Devices at the Distributed Edge are running the correct software version.

These challenging environmental conditions and deployment requirements bring in their own set of security attack possibilities. Examples include:

1. Physical attacks, such as booting from a USB key with modified software, installing firmware rootkits, or altering the device's hardware configuration by adding an unauthorized PCI peripheral or removing an existing PCI device;

2. Attacks over the network, such as modifying operating system (OS) partitions to boot a different and potentially modified and/or malicious version of the software running on the Edge Computing Device at the Distributed Edge;

3. An attempt to steal the device and operate it in a different location, for offline hacking, in an attempt to decrypt the encrypted volumes stored on the device by booting different, malicious software; and 4. Use of a malicious software version that boots up and mimics the legal version expected by the Trusted Controller to extract the latest configuration from the Trusted Controller, which may contain secretive information like cloud storage credentials, sensitive user data such as cloud configurations for a Edge Container Instance, and/or the like.

SUMMARY

Described herein are various techniques for securing Edge Computing Devices. In some implementations, Edge Computing Devices at the Distributed Edge may maintain operational availability in the diverse conditions outlined above, and at the same, may support a security framework to detect and mitigate the security challenges outlined above. In some cases, the Edge Computing Device may accomplish one or more of the following objectives:

1. Measure the boot chain of Edge Computing Devices at the Distributed Edge;

2. Detect any discrepancies in the boot chain and disallow access to sensitive resources in Edge Orchestrator (such as credentials);

3. Allow Edge Computing Devices at the Distributed Edge to access encrypted information, as long as the measurements do not change, perhaps after reboots, even when the Trusted Controller is not reachable;

4. Have a self-locking mechanism to restrict access to encrypted volumes in case of a change in the boot chain, even during offline operation; and/or

5. Allow secure system updates (for example, to the OS, BIOS, and/or Firmware) when there are long periods of disconnectivity or in a complete air gapped environment, without compromising any of the security objectives in 1 to 4 above.

As mentioned above, boot integrity may play a key role in providing trust, enabling users to verify that the system was bootstrapped with untampered software/hardware to allow access to protected resources in the local machine only on the basis of trusted boot measurements.

The systems and methods described herein may further address the inflexibility of Trusted Platform Module ("TPM") boot measurements-based access control policies, striving to resolve an issue identified in objective 5 above. In some embodiments, flexibility may be introduced to access control policies that rely on static boot integrity measurement. By doing so, the systems and methods described herein may address challenges associated with keeping the system secure and functioning (fulfilling objectives 1, 2, 3, and 4 described above) while allowing legitimate software or hardware updates, especially in environments devoid of remote connectivity.

Such disconnected environments, also known as "air-gapped systems" or "air-gapped environments," may be designed to operate in complete isolation from external networks, rendering them physically or logically disconnected from the Internet and/or other connected systems, in order to minimize the risk of unauthorized access or data breaches. Because of this, air-gapped systems may lack the means to access a trusted remote controller for essential operations like secure system update, remote attestation, or remote encryption key management.

Despite these limitations, there are scenarios in which the need to import data into an air-gapped system may arise, for example, for legitimate software or hardware updates. In such cases, after a thorough review process to ensure the integrity and security of the imported data, data may only be movable to the secure and isolated system using out-of-band methods, but not in the reverse direction. This limitation may serve to mitigate the risk of unauthorized data transfer.

By leveraging existing data import procedures, data may be imported to enable a flexible access control mechanism to fulfill objective 4 above in case of a legitimate change in the system. The data to be imported may consist only of public information, so that its leakage may bear no security risk. Data integrity may be checked by the Edge Computing Device's TPM chip during the import process. This information may be imported as an individual data package and/or integrated into a greater software update package.

According to some embodiments, a computer-implemented method may be used to establish trustworthiness of an Edge Computing Device through the use of platform configurable registers (PCRs), which are memory locations within a TPM system with unique properties, such as the need for a special command to modify values stored in the PCRs. The method may include generating a predicted PCR value for a system update and storing the predicted PCR value. The method may further include running the system update by storing updated software on the Edge Computing Device, measuring one or more aspects of the updated software to generate a measured PCR value, and comparing the measured PCR value with the predicted PCR value to determine whether the measured PCR value matches the predicted PCR value. Responsive to determining that the measured PCR value matches the predicted PCR value, secret or sensitive information may be transmitted. Storing the updated software may include storing an updated version of at least one of firmware, BIOS, a boot loader, and an operating system.

Storing the predicted PCR value may include storing the predicted PCR value in a trusted platform module (TPM).

Predicting the PCR value may include using a TPM log to generate a pre-calculated hash of one or more changed parts of the updated software.

Predicting the PCR value may include predicting the PCR value in a Trusted Controller. Running the system update may include running the system update in the Edge Computing Device.

Running the system update may include running the system update with the Edge Computing Device in an air-gapped environment.

The method may further include using Enhanced Authorization to generate an authorization policy including the predicted PCR value.

Generating the authorization policy may include storing a private key.

Generating the authorization policy may further include storing the private key in a Trusted Controller, and storing a public key corresponding to the private key in the Edge Computing Device.

Generating the authorization policy may include generating the authorization policy in a Trusted Controller. Running the system update may include running the system update in the Edge Computing Device. The method may further include transmitting the authorization policy to the Edge Computing Device without transmitting the secret or sensitive information.

Generating the authorization policy may include, prior to running the system update, storing an initial monotonic counter value. Running the system update may include comparing the initial monotonic counter value to a stored monotonic counter value to determine that the system update is not a rollback to a prior version.

Running the system update may further include incrementing the initial monotonic counter value to generate an incremented monotonic counter value. The method may further include storing the incremented monotonic counter value.

Further details are provided below.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

The techniques described herein provide a system and method for ascertaining the trustworthiness of a computing device, such as an Edge Computing Device at a Distributed Edge of a network. The system and method provided herein may be sufficiently robust to use in air-gapped environments, in which system connectivity and/or power are only intermittently available.

System Architecture

According to various embodiments, the systems and methods described herein can be implemented on any electronic device or set of interconnected electronic devices, each equipped to receive, store, and present information. Each electronic device may be, for example, a server, desktop computer, laptop computer, smartphone, tablet computer, a router, a switch, and/or the like. As described herein, some devices used in connection with the systems and methods described herein are designated as client devices, which are generally operated by end users. Other devices are designated as servers, which generally conduct back-end operations and communicate with client devices (and/or with other servers) via a communications network such as the Internet. In at least one embodiment, the techniques described herein can be implemented in a cloud computing environment using techniques that are known to those of skill in the art.

In addition, one skilled in the art will recognize that the techniques described herein can be implemented in other contexts, and indeed in any suitable device, set of devices, or system capable of interfacing with existing enterprise data storage systems. Accordingly, the following description is intended to illustrate various embodiments by way of example, rather than to limit scope.

Figure 1:
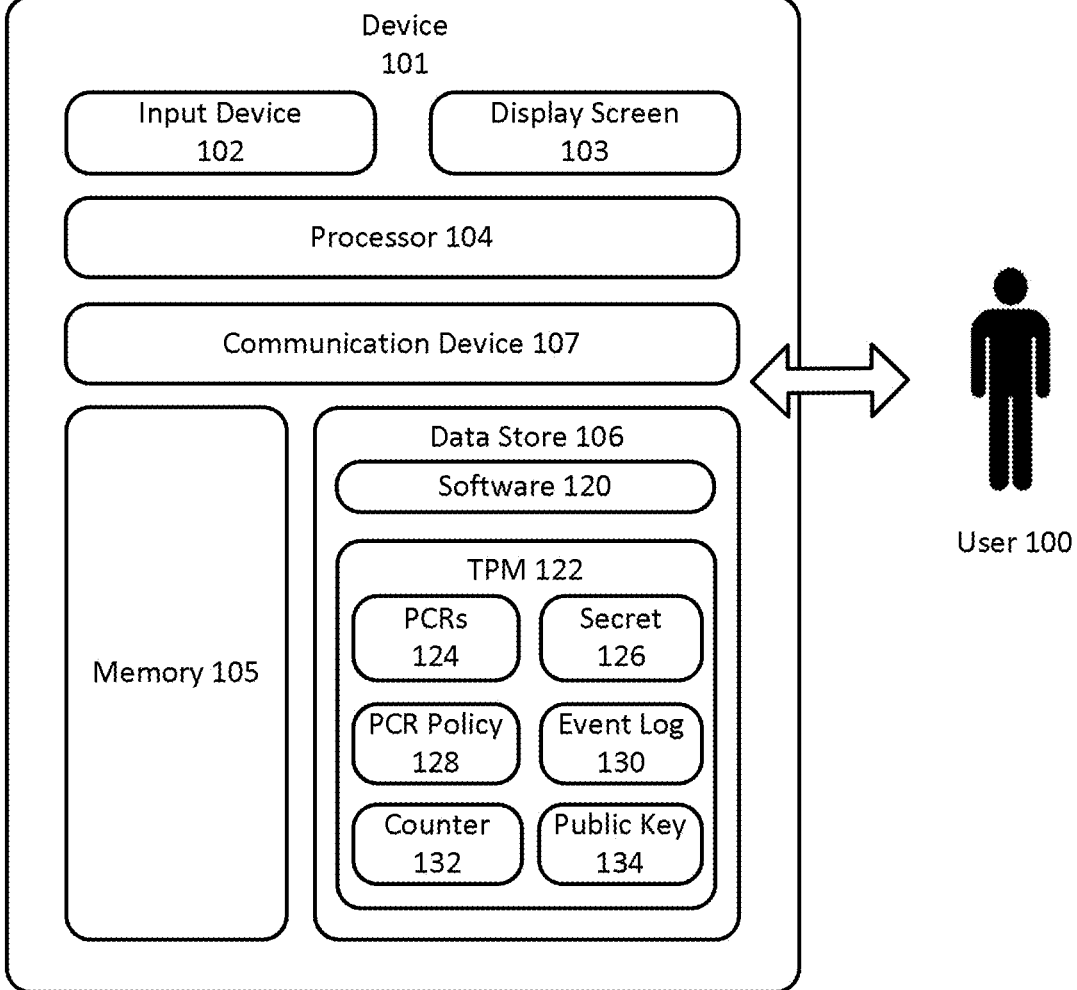
FIG. 1 is a block diagram depicting a hardware architecture for implementing the techniques described herein according to one embodiment.

Referring now to FIG. 1, there is shown a block diagram depicting a hardware architecture for practicing the described system, according to one embodiment. Such an architecture can be used, for example, for implementing the techniques of the system in a computer or other device 101. Device 101 may be any electronic device, and in some embodiments, may be an Edge Computing Device or "Edge Node" at the Distributed Edge of a network.

In at least one embodiment, device 101 includes a number of hardware components that are well known to those skilled in the art. Input device 102 can be any element that receives input from user 100, including, for example, a keyboard, mouse, stylus, touch-sensitive screen (touchscreen), touchpad, trackball, accelerometer, microphone, or the like. Input can be provided via any suitable mode, including for example, one or more of: pointing, tapping, typing, dragging, and/or speech. In at least one embodiment, input device 102 can be omitted or functionally combined with one or more other components.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and data from data store 106 can be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may store datasets such as software 120, which may include firmware, BIOS, a boot loader, an operating system, and/or the like. Data store 106 may further include a trusted platform module (TPM) 122, which may store various components such as platform configurable registers (PCRs) 124, secret information 126 that is to be protected, one or more PCR policies 128, event log 130, monotonic counter 132, public key 134, and/or the like. In at least one embodiment, such data can be stored at another location, remote from device 101, and device 101 can access such data over a network, via any suitable communications protocol.

In at least one embodiment, data store 106 may be organized in a file system, using well known storage architectures and data structures, such as relational databases. Examples include Oracle, MySQL, and PostgreSQL. Appropriate indexing can be provided to associate data elements in data store 106 with each other. In at least one embodiment, data store 106 may be implemented using cloud-based storage architectures such as NetApp (available from NetApp, Inc. of Sunnyvale, California) and/or Amazon Simple Storage Service (Amazon S3) (available from Amazon.com of Seattle, Washington).

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate communication systems.

In at least one embodiment, data store 106 is detachable in the form of a CD-ROM, DVD, flash drive, USB hard drive, or the like. Information can be entered from a source outside of device 101 into data store 106 that is detachable, and later displayed after data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100 on display screen 103. In at least one embodiment, an identifying label is also stored along with each data entry, to be displayed along with each data entry.

Display screen 103 can be any element that displays information such as text and/or graphical elements. In particular, display screen 103 may present a user interface for entering, viewing, configuring, selecting, editing, downloading, and/or otherwise interacting with datasets as described herein. In at least one embodiment where only some of the desired output is presented at a time, a dynamic control, such as a scrolling mechanism, may be available via input device 102 to change which information is currently displayed, and/or to alter the manner in which the information is displayed. In at least one embodiment, display screen 103 can be omitted or functionally combined with one or more other components.

Processor 104 can be a conventional microprocessor for performing operations on data under the direction of software, according to well-known techniques. Memory 105 can be random-access memory, having a structure and architecture as are known in the art, for use by processor 104 in the course of running software.

Communication device 107 may communicate with other computing devices through the use of any known wired and/or wireless protocol(s). For example, communication device 107 may be a network interface card ("NIC") capable of Ethernet communications and/or a wireless networking card capable of communicating wirelessly over any of the 802.11 standards. Communication device 107 may be capable of transmitting and/or receiving signals to transfer data and/or initiate various processes within and/or outside device 101.

In some embodiments, device 101 may be an Edge Computing Device acting as part of a Distributed Edge network. Device 101 may be constantly connected to other devices in the network, or may be only intermittently connected, or even continuously disconnected ("air-gapped").

Figure 2:
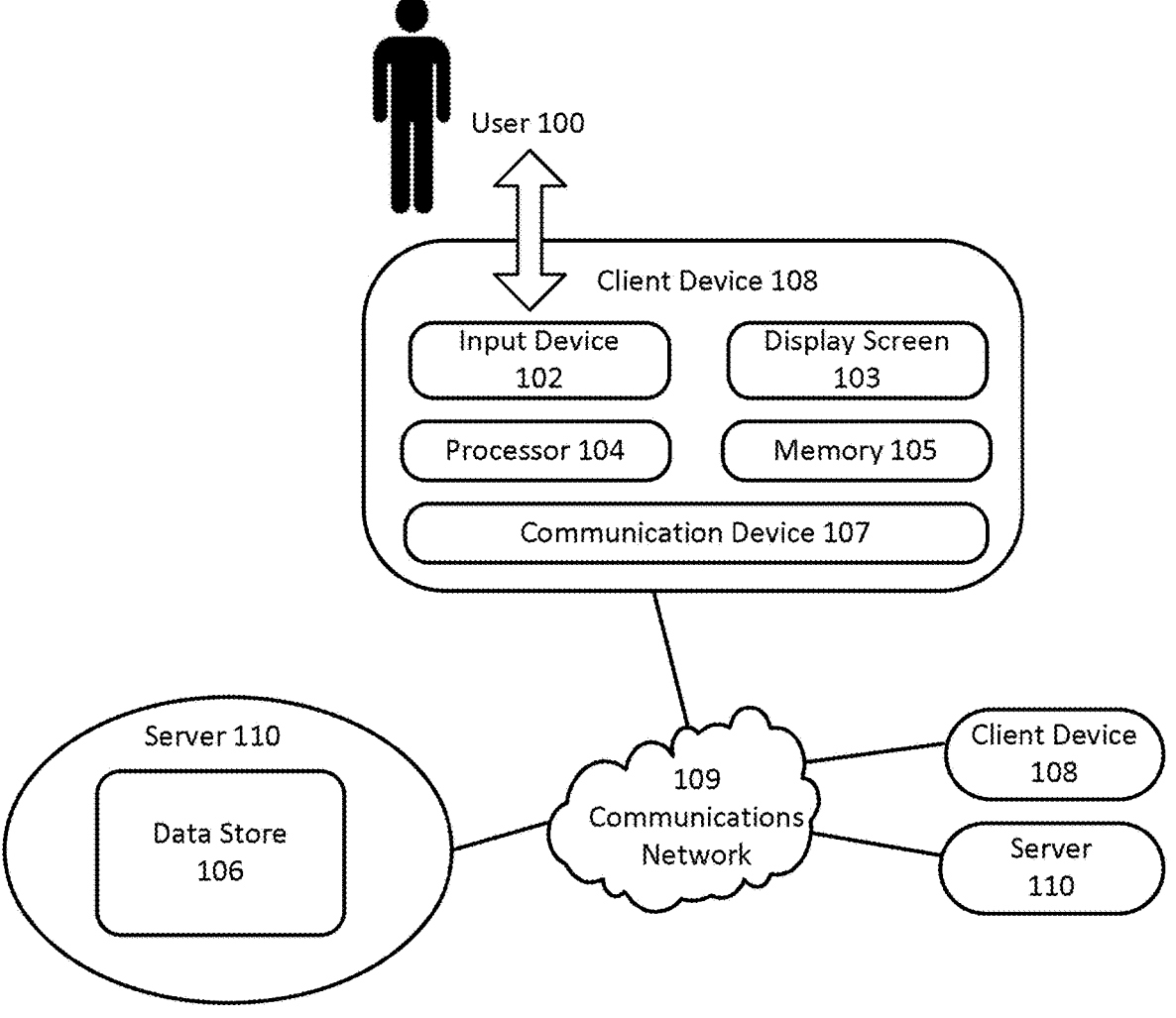
FIG. 2 is a block diagram depicting a hardware architecture for implementing the techniques described herein in a client/server environment, according to one embodiment.

Referring now to FIG. 2, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106 can be presented as part of such web pages and/or other web-based resources, using known protocols and languages such as Hypertext Markup Language (HTML), Java, JavaScript, and the like.

Client device 108 can be any electronic device incorporating input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data. Such requests may be sent via HTTP as remote procedure calls or the like.

In some embodiments, client device 108 may be an Edge Computing Device acting as part of a Distributed Edge network. Like device 101, client device 108 may be constantly connected to other devices in the network, or may be only intermittently connected, or even air-gapped.

In one implementation, server 110 is responsible for data storage and processing, and incorporates data store 106. Server 110 may include additional components as needed for retrieving data from data store 106 in response to requests from client device 108.

As described above in connection with FIG. 1, data store 106 may be organized into one or more well-ordered data sets, with one or more data entries in each set. Data store 106, however, can have any suitable structure, and may store data according to any organization system known in the information storage arts, such as databases and other suitable data storage structures. As in FIG. 1, data store 106 may store datasets, including but not limited to software 120, TPM 122, PCR's 124 secret information 126, PCR policy 128, event log 130, monotonic counter 132, public key 134, and/or the like; alternatively, such data can be stored elsewhere (such as at another server) and retrieved as needed.

In addition to or in the alternative to the foregoing, data may also be stored in data store 106 that is part of client device 108. In some embodiments, such data may include elements distributed between server 110 and client device 108 and/or other computing devices in order to facilitate secure and/or effective communication between these computing devices.

As discussed above in connection with FIG. 1, display screen 103 can be any element that displays information such as text and/or graphical elements. Various user interface elements, dynamic controls, and/or the like may be used in connection with display screen 103.

As discussed above in connection with FIG. 1, processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software. Communication device 107 may communicate with other computing devices through the use of any known wired and/or wireless protocol(s), as discussed above in connection with FIG. 1.

In one embodiment, some or all of the system can be implemented as software written in any suitable computer programming language, whether in a standalone or client/server architecture. Alternatively, some or all of the system may be implemented and/or embedded in hardware.

Notably, multiple client devices 108 and/or multiple servers 110 may be networked together, and each may have a structure similar to those of client device 108 and server 110 that are illustrated in FIG. 2. The data structures and/or computing instructions used in the performance of methods described herein may be distributed among any number of client devices 108 and/or servers 110. As used herein, "system" may refer to any of the components, or any collection of components, from FIGS. 1 and/or 2, and may include additional components not specifically described in connection with FIGS. 1 and 2. As indicated above, device 101 and/or client device 108 may be intermittently and/or continuously air-gapped from other network devices. As such, communication between device 101 and/or client device 108 and other network resources may, when necessary, be via manual measures, such as connection of a portable storage device such as a USB drive.

In some embodiments, data within data store 106 may be distributed among multiple physical servers. Thus, data store 106 may represent one or more physical storage locations, which may communicate with each other via the communications network and/or one or more other networks (not shown). In addition, server 110 as depicted in FIG. 2 may represent one or more physical servers, which may communicate with each other via communications network 109 and/or one or more other networks (not shown). Part of data store 106 may reside on device 101 and/or client device 108, which may be air-gapped from other network resources as described previously.

In one embodiment, some or all components of the system can be implemented in software written in any suitable computer programming language, whether in a standalone or client/server architecture. Alternatively, some or all components may be implemented and/or embedded in hardware.

TPM Measured Boot

"Measured boot" is a boot sequence starting at a Root of Trust for Measurement or RTM (i.e. BIOS Initial Boot Block), initiating a series of measurements including measurements of all security-relevant components (for example, firmware, BIOS, Option ROMs, boot loader, root filesystem, operating system, and/or the like). The measurements may be stored in PCRs 124 of TPM 122.

PCR 124 may be a memory register inside TPM 122 that can store the output of a hash algorithm. TPM 122 may come equipped with 24 PCR slots. TPM PCRs 124 may have a set of unique properties. In at least one embodiment, it may not be possible to reset or directly write to these memory registers; rather, the result of an Extend operation may be written to PCR 124. In at least one embodiment, PCR registers 124 may be set to their fixed initial value only at power on or system reset.

An "Extend operation" is the process of calculating a new value for PCR 124 by combining the input value with current PCR value 124 through a cryptographic operation (typically a hash function). The result becomes the new value of PCR 124. The following is an exemplary PCR Extend operation:

$$New\_PCR\_Value[i]=SHA\text{-}256(Old\_PCR\_Value[i]$$
$$\|Input\_Digest)$$

Here, the $\|$ indicates concatenation.

A "measurement" may be created by computing a hash (digest) of the next content that affects the boot process, and storing and extending it into PCR 124. The measured data can be code (such as BIOS, UEFI, or Firmware code) or configuration data (such as kernel boot parameters).

For example, at system power on, before transferring the execution flow to the next stage, processor 104 may first measure the BIOS/UEFI binary executable code and configuration data by storing and extending their digest (cryptographic hash such as SHA256) into PCR 124. BIOS/UEFI, and subsequent stages may perform the same measurement process before transferring the execution flow to the next stage. This process is called "Measured Boot."

The aforementioned Extend operation may ensure that the value of each measurement relies on the previous value to achieve a property called stream integrity. This way, measurements may form a chain, so that any changes in measurement output of one stage of the boot process will propagate into the next ones, resulting in a different set of PCR values 124 at the end.

At the end of the measured boot process, the system may be provided with a set of PCR values 124, the result of performing extended operation on data that was measured. These values may be used for local access policy checks and/or remote attestation. The following is a sample of PCR indexes 124 with their values after system boot-up:

0: 0x279d0bf5d9435c8b719f42031fc7d1d706b0e7ec-974e58f52a1d915c687aac1d
1: 0xcc8850302d0bc54e7f2127cd243028b8e5389e3109-adb43a74f3acf05b1e892e
2: 0x0f6d6de2a9e28f193d0930f219510e80a0322768ce-0ea7044f60f381f40e14c4
3: 0x3d458cfe55cc03ea1f443f1562beec8df51c75e14a-9fcf9a7234a13f198e7969
4: 0x025e44fbbf14d64fb60c6e8ff74710a17ae778ae-8559ae4634bd4d29f6818892
5: 0xdf2af523c5169c1f1a17c933b6896c1c7283f9e-3240cfc403b4de9f9bc68d7e3
6: 0x3d458cfe55cc03ea1f443f1562beec8df51c75e14a-9fcf9a7234a13f198e7969
7: 0xa927857cdc7cbf4fdf9f6d5f506373d33abadcf1206-caf0140330ff924d7f280
8: 0x8f3d86443522b1737bedcd15accc1f49971e6318-7189253a0042c84255ef3284
9: 0x1a1961c687866a98a99188e4e74aba2c9cad9729a-91a209396e6ed2f5cf1c418

13: 0xcb18c5c53a23f83b3330220f947d5ff0914de89-162616ecda4d013bcbf6db096

TPM Protected Resources and Access Control Policies

In addition to the measured boot, TPM 122 may allow storing a limited amount of information, such as secret information 126, in its non-volatile memory. TPM-stored objects may be protected using an authorization value, which may act as an access control policy. Such an authorization value may include, for example, a user-provided password, proving position of a cryptographic key, or output of the measured boot process.

In at least one embodiment, an authorization value may be generated by binding the release of a resource to the static value of a set of PCRs 124, known as PCR policy 128. This procedure may allow users to store a resource (such as an encrypted volume key) into TPM 122 by asking TPM 122 to bind its release to the recorded value of one or more selected PCRs 124 and reveal secret information 126 in the future only if future PCRs value 124 are equal to the one stored with the resource at its creation time. As mentioned previously, PCR values 124 are not forgeable, and PCR values 124 are directly linked to the measured boot. Accordingly, by using PCR policy 128, users may protect a resource and reveal it only if the system is booted to a trusted known-good-state (e.g. trusted PCRs value 124), otherwise it may be assumed the change in PCRs 124 are as result of a malicious activity and the protected resource may not be revealed.

The above-described process works well as long as there is no change in the boot measurements and resulting PCR values 124, but can be problematic in the case of a legitimate system update or similar situation. A system update can update parts of the system that are part of the measured boot (for example, a firmware or OS update to patch a vulnerability or add new features). The resulting mismatch (inequality) between new PCR values 124 and old PCR values 124 may cause the policy evaluation to fail, and release of protected resources may become impossible. To release the protected resource, the system may provide an option to revert to the previous state (vulnerable/featureless) or to perform an external assessment and approval process to restore and re-seal the protected resource under new PCR values 124. In at least one embodiment, a disk encryption key may be wrapped using a TPM key and backed up before such external assessment and approval process is performed. The latter option may require access to a remote controller and successful passing of an attestation process.

In an air-gapped environment, when moving device 101 out of the disconnected environment may not be an option, communication may take place using out-of-band methods, and data may be allowed to move only in one direction (to device 101 and not from device 101). Thus, remote attestation with a Trusted Controller and subsequent restoring and re-sealing of the protected resource may not be feasible. Thus, further measures may be used to provide attestation in the air-gapped environment, as will be set forth below.

TPM Event Log

TPM event log 130 may be a record of measurements, which may capture information about the system's state and activities, including measurements of the boot process, firmware, and software components. Each entry in TPM event log 130 may include items such as event type, event data, and a cryptographic hash representing the state at a specific point in time. The following is one exemplary excerpt from TPM event log 130, including an entry corresponding to event number 158, which is part of the boot process grub measuring a command it is about to execute, into PCR index 8:

```
- EventNum: 158
  PCRIndex: 8
  EventType: EV_IPL
  DigestCount: 1
  Digests:
  - AlgorithmId: sha256
    Digest: "cbcb4197d11e6fcce16e7a83ac9d7a75d00654c3f3511f07c99834a0bf1d5194"
  EventSize: 66
  Event:
    String: |-
      "grub_cmd set_global dom0_extra_args video=efifb:off console=tty0\0"
```

TPM Enhanced Authorization

Enhanced Authorization (EA) may be a mechanism included in TPM 2.0, and may provide a rich authorization model for specifying flexible access control policies for TPM-resident objects. In at least one embodiment, the system and method may use TPM Enhanced Authorization ("EA"), which allows arbitrary complex access control policies for a TPM stored object. In at least one embodiment, mutable access control policies may be created. A mutable policy may bind the evaluation of the policies not just to a static value (for example equality of a current PCR value 124 with an old PCR value 124), but to two distinct checks:

1. Verification of cryptographic signature of the access control policy against a TPM stored public key 134 for which the associated private part is used to sign the access control policy; and 2. Runtime validation of PCR policy 128 itself.

Using EA, instead of using the fixed value of PCR registers 124 as the authorization value, TPM may use a cryptographic hash of a public key structure as a primary and immutable authorization value and a signed run-time policy as secondary point of evaluation to complete the authorization process. The secondary run-time policy can be a PCR policy 128 with fixed PCR value 124.

In such a schema, to authorize the release of a protected resource under the EA policy, TPM 122 may first verify the signature of the run-time policy using the authorization public key 134. If the signature verification was successful, then TPM 122 may evaluate the run-time policy. The resource may be released only if the run-time policy evaluation was also successful (i.e. current boot PCRs 124 are equal to run-time policy PCRs 124).

There may be no limit on the number of secondary policies as long as they are validly signed. TPM 122 may evaluate an arbitrary number of TPM policies 128 and may release secret information 126 if at least one of the run-time policies holds.

TPM 2.0 Monotonic Counters

In addition to EA, TPM monotonic counters 132 are another technology that may be used in implementing a secure and flexible access policy mechanism. Trusted Platform Module monotonic counters 132 may be implemented as cryptographic mechanisms within TPM 122 that serve as secure, incrementing counters, resistant to tampering. These monotonic counters 132 may provide a reliable measure of the number of operations that have occurred on a system such as device 101. Monotonic counters 132 may ensure that once a counter value has been increased, it cannot be decreased or reset, maintaining an ever-increasing sequence of values.

TPM Usage

In some embodiments, TPM 122 may be used to store and protect a disk encryption key. After installing the operating system in a trusted environment with a trusted set of hardware and software (i.e., firmware), a disk encryption key may be generated and stored in TPM 122 using PCR policy 128. The disk encryption key may be part of secret information 126. PCR policy 128 may use the current value of PCRs 124 (users can select PCR indexes 124 that are part of the policy) as the authorization value of the object. As described before, PCR values 124 may function as a snapshot of the system status after it has booted (including, for example, measured boot codes, operating system code, system confirmation values, and/or the like).

In subsequent system boot ups, the OS may ask the TPM to evaluate PCR policy 128 and reveal the disk encryption key. If there is no change in the boot process (i.e., current PCR values 124 are equal to previously established PCR values 124), TPM 122 may reveal the disk encryption key to the OS.

In some cases, changes in the system that affect the measured boot (legitimate or not), may fail the evaluation of PCR policy 128 (and thereby prevent the system from being functional) because the disk encryption key may become unavailable. To solve this issue for the legitimate case (such as an intentional firmware or OS kernel update), a combined "OR" policy may be used. Such a policy may add an additional policy to the protected object. The second policy in the combined policy may be a password policy, which may allow the user to store and subsequently enter a password to reveal secret information 126. Using such a combined policy, final policy 128 may be: "PolicyPCR‖PolicyPassword", meaning the protected object is released if either of the policies evaluate to True.

With a combined policy, after a legitimate system update, PCR policy 128 may fail and the system may fall back to the password. If the valid password is entered, the system may successfully finish the boot process, and then update PCR policy 128 with current PCR values 124 to allow seamless system boot up to take place in future instances.

Predictive Approach

Existing techniques, even if they fall back to password methods, may have the following shortcomings:

A. The need for a system operator to be present after a system update to enter a password;

B. The need to trust the system operator with secret information 126 (such as the password) that can be potentially used to compromise the entire system, for example by installing malicious software; and C. The need to manage passwords at scale when dealing with thousands of edge nodes.

In at least one embodiment, these shortcomings may be addressed by implementing a predictive attestation policy. One example of such an approach is shown and described in connection with FIG. 3.

Figure 3:
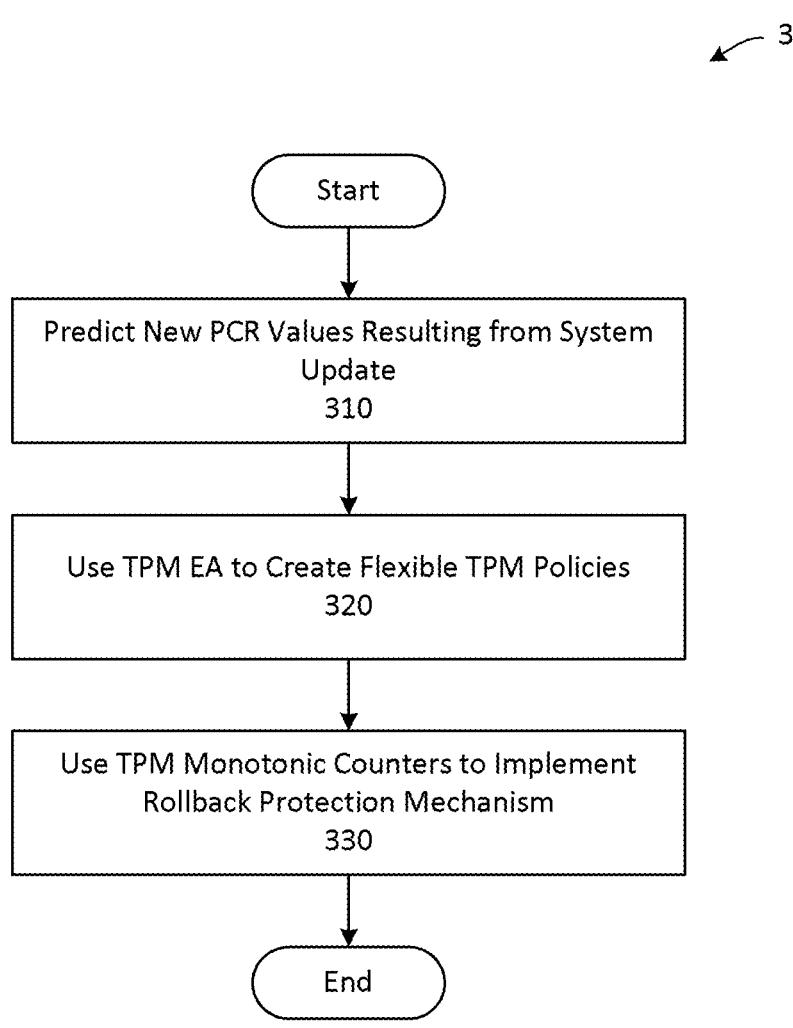
FIG. 3 is a flow diagram showing an attestation method according to one embodiment.

Referring now to FIG. 3, there is shown a flow diagram depicting an attestation method 300 that may be used, for example, to establish trustworthiness of a computing device such as an Edge Computing Device. In some embodiments, one or more steps of method 300 may be carried out via TPM 122. Method 300 may include, but is not limited to, the following steps:

Predicting new PCR values 124 as result of system update in step 310;

Using TPM EA to create flexible TPM policies 128 in step 320; and

Using TPM monotonic counters 132 to implement a rollback protection mechanism in step 330.

As described previously, a system update can result in a different set of PCR values 124, causing policy evaluation failure. In step 310, the system may predict new PCR values 124 that result from a BIOS update, firmware update, operating system update, and/or the like. To predict the new PCR values 124, edge nodes TPM event log 130 may be used to pre-calculate the hash of the changed parts of the system.

As also set forth previously, TPM event log 130 may contain all measured PCR values 124. To predict a new PCR value 124, the system may first calculate the hash of the changes and update subsequent PCR values 124 accordingly. For example, if a system update changes the event number 158 from the exemplary TPM event log 130 described above, the system may calculate the hash of the new grub command and use this new hash to replay all the subsequent events from event number 159 to the end of the measured boot process by performing subsequent Extend operations to calculate the final set of updated PCR values 124. This process may be repeated for all changes.

Combining the PCR prediction of step 310 with the Enhanced Authorization of step 320, the described method may keep the Edge Computing Device functional without removing it from the air-gapped environment. In step 330, monotonic counters 132 may be used to prevent reversion to prior PCR values 124.

Figure 4:
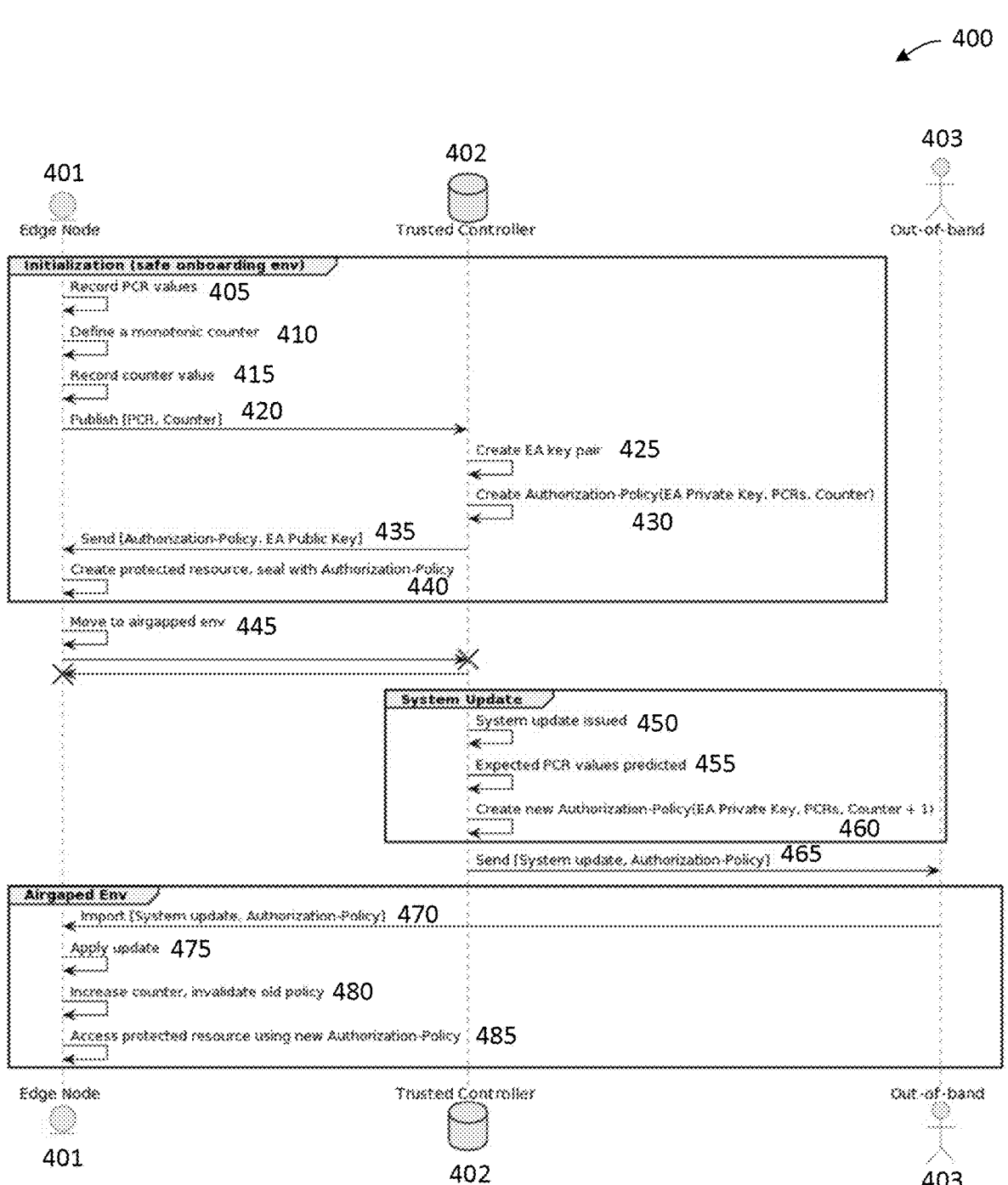
FIG. 4 is a data flow diagram illustrating the method of FIG. 3 in greater detail.

Referring now to FIG. 4, there is shown a data flow diagram 400 illustrating method 300 of FIG. 3 in greater detail. Data flow diagram 400 illustrates the following steps, showing communication between Edge Node 401 (e.g., the Edge Computing Device, which may be a device 101 as shown in FIG. 1), Trusted Controller 402 (e.g., another device 101 for which trust has been established), and out-of-band node 403, with reference to the data structures and elements shown in FIG. 1:

1. Edge Node 401 may record trusted PCR values 124 for Edge Node 401 in a safe provisioning environment in step 405.

2. Edge Node 401 may create a new monotonic counter 132 in a safe provisioning environment in step 410.

3. Edge Node 401 may record the new monotonic counter 132 in step 415.

4. Trusted PCR values 124, TPM event log 130, and initial value of monotonic counter 132 may be published to Trusted Controller 402 in step 420.

5. Trusted Controller 402 may create a PCR policy 128 using trusted PCR values 124 and tag it with the current value of the reported monotonic counter 132 in step 425. This may entail creation of an EA key pair, such as a private key and a public key.

6. Trusted Controller 402 may sign PCR policy 128 plus the tag for monotonic counter 132 using the private part of the authorization key in step 430.

7. Signed PCR policy 128 may be delivered to Edge Node 401 in step 435.

8. Edge Node 401 may create a protected resource (for example, secret information 126) and may seal the protected resource with Enhanced Authorization under an authorization public key 134 that comes from the Trusted Controller 402, in step 440. This key may be trusted and may even be extracted from one of the pre-provisioned trusted certificates that come with the Operating System used by Edge Node 401.

9. Edge Node 401 may be moved to the air-gapped environment in step 445.

With the Edge Node 401 in an air-gapped environment, a new system update may be issued as follows:

1. New PCR values 124 (as result of the system update) may be computed in a safe environment and published to Trusted Controller 402, in step 450.

2. Trusted Controller 402 may create a new PCR policy 128 using PCRs 124 that match the system state after update in step 455. The new PCR policy 128 may include prediction of expected PCR values for comparison with measurements that will be taken pursuant to the update.

3. Trusted Controller 402 may tag new PCR policy 128 with the next increment of reported monotonic counter 132, and sign the policy plus the value of monotonic counter 132 using the private part of the authorization key, in step 460.

4. The Trusted Controller 402 may send the system update and/or new PCR policy 128, for example, to out-of-band node 403 in step 465.

5. The system update may be delivered to Edge Node 401. Specifically, new signed PCR policy 128 that matches the system state after update may be delivered to Edge Node 401 using out-of-band methods (such as, for example, by using a USB drive or other device, or as part of an OS update package) in step 470.

6. Edge Node 401 may apply the update using new signed PCR policy 128 in step 475.

7. After successful system boot up, Edge Node 401 may increment TPM monotonic counter 132 and invalidate old PCR policy 128 in step 480.

8. Edge Node 401 may use new signed PCR policy 128 to release secret information 126 in step 485.

The data flow of FIG. 4 is merely exemplary. In some embodiments, steps indicated as being performed at the Edge Node 401 may instead be performed at the Trusted Controller 402 and/or other components, or vice versa. Further, in some embodiments, steps of FIG. 4 may be omitted, replaced with alternatives, and/or supplemented with additional steps that would be envisioned by a person skilled in the art with the aid of the present disclosure.

In some embodiments, the packed information that is used in updating the enhanced authorization policy, or PCR policy 128, may contain no secret information and may be transmitted in clear text without any security implication. The integrity of the data may be checked by TPM 122 once the policy is used. TPM 122 may check that PCR policy 128 has a valid signature (signed by the private key held in a trusted controller) before even evaluating PCR policy 128 itself.

In some cases, the use of Enhanced Authorization (EA) may require that the authorization key be immutable, with the only way to update being to destroy the TPM object and create a new one using a new authorization key. Thus, unless additional measures are taken, it may be possible to ask TPM 122 to evaluate any validly signed policy for releasing the protected resource. This could be potentially risky in a situation where the system is updated to patch a critical security vulnerability. In an attack scenario, an attacker could downgrade the system to the old version, use a vulnerability to gain access to the system (e.g., device 101) at run-time and then use an old (but validly signed) policy that matches the current system state to release the TPM-stored secret information 126 and steal the secret information 126.

In some embodiments, this risk may be addressed by extending EA policies with an access control policy based on TPM 2.0 monotonic counters 132. This addition may serve to fortify the security architecture by employing monotonic counters 132 to prevent potential downgrades of the system or the utilization of outdated signed policies.

Specifically, run-time policies may be tagged using the current value of the targeted TPM monotonic counter 132. Subsequently, monotonic counter 132 may be incremented after each successful policy update, such as during a system update. This strategic use of monotonic counters 132 may act as a safeguard, preventing the validation of old policies 128 with outdated monotonic counter values 132 as valid run-time policies 128. By introducing such a mechanism, the system may ensure that even if a policy is validly signed, it will not be accepted as a legitimate run-time policy if it bears an old value of monotonic counter 132. This arrangement may add a layer of robustness to the access control framework, enhancing overall system security and integrity.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. In addition, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to convey the substance of their work most effectively to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMS, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Washington; MacOS, available from Apple Inc. of Cupertino, California; iOS, available from Apple Inc. of Cupertino, California; Android, available from Google, Inc. of Mountain View, California; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for establishing trustworthiness of an Edge Computing Device, the method comprising:

at one or more hardware processing devices, predicting a platform configurable register (PCR) value for a system update to generate a predicted PCR value;

at one or more storage devices, storing the predicted PCR value;

at the one or more hardware processing devices:

running the system update by storing updated software on the one or more storage devices;

measuring one or more aspects of the updated software to generate a measured PCR value; and comparing the measured PCR value with the predicted PCR value to determine that the measured PCR value matches the predicted PCR value; and at one or more communication devices, responsive to determining that the measured PCR value matches the predicted PCR value, transmitting secret information stored on the one or more storage devices.

2. The method of claim 1, wherein storing the updated software comprises storing an updated version of at least one of firmware, BIOS, a boot loader, and an operating system.

3. The method of claim 1, wherein storing the predicted PCR value comprises storing the predicted PCR value in a trusted platform module (TPM) stored on the one or more storage devices.

4. The method of claim 1, wherein predicting the PCR value comprises using a TPM log stored on the one or more storage devices to generate a pre-calculated hash of one or more changed parts of the updated software.

5. The method of claim 1, wherein predicting the PCR value comprises predicting the PCR value at a first hardware processing device of the one or more hardware processing devices, the first hardware processing device pertaining to a Trusted Controller;

and wherein running the system update comprises running the system update on a second hardware processing device of the one or more hardware processing devices, the second hardware processing device pertaining to the Edge Computing Device.

6. The method of claim 5, wherein running the system update comprises running the system update with the Edge Computing Device in an air-gapped environment.

7. The method of claim 1, further comprising, at the one or more hardware processing devices, using Enhanced Authorization to generate an authorization policy comprising the predicted PCR value.

8. The method of claim 7, wherein generating the authorization policy comprises storing a private key in the one or more storage devices.

9. The method of claim 7, wherein generating the authorization policy comprises generating the authorization policy at a first hardware processing device of the one or more hardware processing devices, the first hardware processing device pertaining to a Trusted Controller;

wherein running the system update comprises running the system update on a second hardware processing device of the one or more hardware processing devices, the second hardware processing device pertaining to the Edge Computing Device;

and wherein the method further comprises, at the one or more communication devices, transmitting the authorization policy to the Edge Computing Device without transmitting the secret information or other sensitive information.

10. The method of claim 7, wherein generating the authorization policy comprises, at the one or more storage devices and prior to running the system update, storing an initial monotonic counter value;

and wherein running the system update comprises comparing the initial monotonic counter value to a stored monotonic counter value to determine that the system update is not a rollback to a prior version.

11. The method of claim 8, wherein generating the authorization policy further comprises:

storing the private key in a first one of the one or more storage devices pertaining to a Trusted Controller; and storing a public key corresponding to the private key in a second one of the one or more storage devices pertaining to the Edge Computing Device.

12. The method of claim 10, wherein running the system update further comprises incrementing the initial monotonic counter value to generate an incremented monotonic counter value;

and wherein the method further comprises, at the one or more storage devices, storing the incremented monotonic counter value.

13. A non-transitory computer-readable medium for establishing trustworthiness of an Edge Computing Device, comprising instructions stored thereon, that when performed by one or more hardware processing devices, perform the steps of:

predicting a platform configurable register (PCR) value for a system update to generate a predicted PCR value;

causing one or more storage devices to store the predicted PCR value;

running the system update by storing updated software on the one or more storage devices;

measuring one or more aspects of the updated software to generate a measured PCR value; and comparing the measured PCR value with the predicted PCR value to determine that the measured PCR value matches the predicted PCR value; and causing one or more communication devices, responsive to determining that the measured PCR value matches the predicted PCR value, to transmit secret information stored on the one or more storage devices.

14. The non-transitory computer-readable medium of claim 13, wherein storing the updated software comprises storing an updated version of at least one of firmware, BIOS, a boot loader, and an operating system;

and wherein storing the predicted PCR value comprises storing the predicted PCR value in a trusted platform module (TPM) stored on the one or more storage devices.

15. The non-transitory computer-readable medium of claim 13, wherein predicting the PCR value comprises using a TPM log stored on the one or more storage devices to generate a pre-calculated hash of one or more changed parts of the updated software.

16. The non-transitory computer-readable medium of claim 13, wherein predicting the PCR value comprises predicting the PCR value at a first hardware processing device of the one or more hardware processing devices, the first hardware processing device pertaining to a Trusted Controller;

wherein running the system update comprises running the system update on a second hardware processing device of the one or more hardware processing devices, the second hardware processing device pertaining to the Edge Computing Device;

and wherein running the system update comprises running the system update with the Edge Computing Device in an air-gapped environment.

17. The non-transitory computer-readable medium of claim 13, further comprising instructions stored thereon, that when performed by the one or more hardware processing devices, use Enhanced Authorization to generate an authorization policy comprising the predicted PCR value.

18. The non-transitory computer-readable medium of claim 17, wherein generating the authorization policy comprises storing a private key in the one or more storage devices;

and wherein generating the authorization policy further comprises:

storing the private key in a first one of the one or more storage devices pertaining to a Trusted Controller; and storing a public key corresponding to the private key in a second one of the one or more storage devices pertaining to the Edge Computing Device.

19. The non-transitory computer-readable medium of claim 17, wherein generating the authorization policy comprises generating the authorization policy at a first hardware processing device of the one or more hardware processing devices, the first hardware processing device pertaining to a Trusted Controller;

wherein running the system update comprises running the system update on a second hardware processing device of the one or more hardware processing devices, the second hardware processing device pertaining to the Edge Computing Device;

and wherein the non-transitory computer-readable medium further comprises instructions stored thereon, that when performed by the one or more hardware processing devices, cause the one or more communication devices to transmit the authorization policy to the Edge Computing Device without transmitting the secret information or other sensitive information.

20. The non-transitory computer-readable medium of claim 17, wherein generating the authorization policy comprises, at the one or more storage devices and prior to running the system update, storing an initial monotonic counter value;

wherein running the system update comprises comparing the initial monotonic counter value to a stored monotonic counter value to determine that the system update is not a rollback to a prior version;

wherein running the system update further comprises incrementing the initial monotonic counter value to generate an incremented monotonic counter value;

and wherein the non-transitory computer-readable medium further comprises instructions stored thereon, that when executed by the one or more hardware processing devices, cause the one or more storage devices to store the incremented monotonic counter value.

21. A system for establishing trustworthiness of an Edge Computing Device, the system comprising:

one or more hardware processing devices configured to predict a platform configurable register (PCR) value for a system update to generate a predicted PCR value; and one or more storage devices configured to store the predicted PCR value;

wherein the one or more hardware processing devices are further configured to:

run the system update by storing updated software on the one or more storage devices;

measure one or more aspects of the updated software to generate a measured PCR value; and compare the measured PCR value with the predicted PCR value to determine that the measured PCR value matches the predicted PCR value;

and wherein the system further comprises one or more communication devices configured to, responsive to determining that the measured PCR value matches the predicted PCR value, transmit secret information stored on the one or more storage devices.

22. The system of claim 21, wherein the one or more storage devices are further configured to store the updated software by storing an updated version of at least one of firmware, BIOS, a boot loader, and an operating system;

and wherein the one or more storage devices are further configured to store the predicted PCR value by storing the predicted PCR value in a trusted platform module (TPM) stored on the one or more storage devices.

23. The system of claim 21, wherein the one or more hardware processing devices are further configured to predict the PCR value by using a TPM log stored on the one or more storage devices to generate a pre-calculated hash of one or more changed parts of the updated software.

24. The system of claim 21, wherein the one or more hardware processing devices are further configured to predict the PCR value by predicting the PCR value at a first hardware processing device of the one or more hardware processing devices, the first hardware processing device pertaining to a Trusted Controller;

wherein the one or more hardware processing devices are further configured to run the system update by running the system update on a second hardware processing device of the one or more hardware processing devices, the second hardware processing device pertaining to the Edge Computing Device;

and wherein the one or more hardware processing devices are further configured to run the system update by running the system update with the Edge Computing Device in an air-gapped environment.

25. The system of claim 21, wherein the one or more hardware processing devices are further configured to use Enhanced Authorization to generate an authorization policy comprising the predicted PCR value.

26. The system of claim 25, wherein the one or more hardware processing devices are further configured to generate the authorization policy by storing a private key in the one or more storage devices;

and wherein the one or more hardware processing devices are further configured to generate the authorization policy further by:

storing the private key in a first one of the one or more storage devices pertaining to a Trusted Controller; and storing a public key corresponding to the private key in a second one of the one or more storage devices pertaining to the Edge Computing Device.

27. The system of claim 25, wherein the one or more hardware processing devices are further configured to generate the authorization policy by generating the authorization policy at a first hardware processing device of the one or more hardware processing devices, the first hardware processing device pertaining to a Trusted Controller;

wherein the one or more hardware processing devices are further configured to run the system update by running the system update on a second hardware processing device of the one or more hardware processing devices, the second hardware processing device pertaining to the Edge Computing Device;

and wherein the one or more communication devices are further configured to transmit the authorization policy to the Edge Computing Device without transmitting the secret information or other sensitive information.

28. The system of claim 25, wherein the one or more hardware processing devices are further configured to generate the authorization policy by causing the one or more storage devices, prior to running the system update, to store an initial monotonic counter value;

wherein the one or more hardware processing devices are further configured to run the system update by comparing the initial monotonic counter value to a stored monotonic counter value to determine that the system update is not a rollback to a prior version;

wherein the one or more hardware processing devices are further configured to run the system update further by incrementing the initial monotonic counter value to generate an incremented monotonic counter value;

and wherein the one or more hardware processing devices are further configured to cause the one or more storage devices to store the incremented monotonic counter value.

* * * * *